United States Patent Office 2,976,328
Patented Mar. 21, 1961

2,976,328

PREPARATION OF 2,2-DIALKOXYPROPANES

Carlos M. Bowman, Midland, Mich., assignor to The Dow Chemical Company, Midland, Mich., a corporation of Delaware No Drawing. Filed Mar. 27, 1959, Ser. No. 802,297

3 Claims. (Cl. 260—615)

This invention relates to a method for the preparation of 2,2-dialkoxypropanes. These compounds have the general formula:

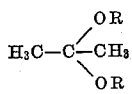

wherein R is a lower alkyl radical containing from 2 to 8 carbon atoms.

The method of the present invention includes contacting, at a temperature of between about 0° C. and about 250° C., a trialkyl borate having the formula:

wherein B is the boron atom and R has the value hereinbefore assigned, with a 2,2-dialkoxypropane having the formula:

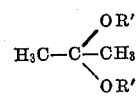

wherein R' is a lower alkyl radical containing from 1 to 7 carbon atoms, removing by distillation one or more fractions containing by-products of the reaction and any unreacted starting materials, and then removing, as by distillation, the desired product, 2,2-dialkoxypropane, from the reaction mixture. This final product may be purified by redistillation, if desired.

The reaction employed in the method of the present invention is metathetical and is shown by the equation:

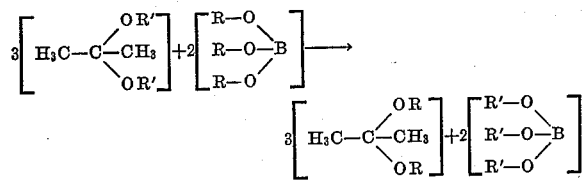

wherein R and R' are non-identical lower alkyl radicals and B is the boron atom, and where one 2,2-dialkoxypropane is thus employed as a reactant to produce another 2,2-dialkoxypropane. The R' group in the 2,2-dialkoxypropane used as a reactant must contain fewer carbon atoms than the R group in the trialkyl borate reactant, so that the 2,2-dialkoxypropane produced has a higher boiling point than the starting 2,2-dialkoxypropane.

The reaction is most conveniently carried out at atmospheric pressure, although pressures above or below atmospheric may be employed, if appropriate. Mole ratios of 3 parts of 2,2-dialkoxypropane to 2 parts trialkyl borate are desirable, although mole ratios from 3:1 to 1:2 may be employed.

The following example is given to illustrate the present invention, but is not to be construed as limiting the invention thereto.

*Example*

In a one-liter, round-bottomed flask equipped with a heating mantle were placed 156 grams (1.5 moles) of 2,2-dimethoxypropane and 230 grams (1.0 mole) of tri-n-butyl borate. The flask was attached to a 36 inch fractionating column and the reaction mixture distilled. There were obtained initially 126 grams of the fraction boiling in the range of 51–75° C., which was essentially trimethyl borate. Then, 54 grams (94 percent of the theoretical yield) of the desired product, 2,2-dibutoxypropane, were removed in the range of 132–150° C. and collected. This is a water-white liquid having an index of refraction, $n_d^{25}$, of 1.405. Identification of the product was confirmed by infra-red analysis.

While the above example describes certain specific starting compounds, other trialkyl borates may be employed as starting compounds, such as, for example, triethyl borate, tri-n-propyl borate, triisopropyl borate, triisobutyl borate, tri-sec-butyl borate, tri-n-amyl borate, tri-n-hexyl borate, tri-n-octyl borate, tri-(2-ethylhexyl) borate, and the like, and analogous 2,2-dialkoxypropanes obtained therefrom.

Similarly, other 2,2-dialkoxypropanes may be employed as starting compounds, such as, for example, 2,2-diethoxypropane, 2,2-dipropoxypropane, 2,2-diisopropoxypropane, 2,2-di-sec-butoxypropane, 2,2-dipentoxypropane, 2,2 - bis(2 - methyl) butoxypropane, 2,2 - dihexoxypropane, 2,2 - bis(3 - ethyl) butoxypropane, 2,2 - diheptoxypropane, 2,2-bis(4-ethyl)pentoxypropane, and the like.

Various modifications may be made in the method of the present invention without departing from the spirit or scope thereof, and it is to be understood that I limit myself only as defined in the appended claims.

I claim:

1. A method for preparing 2,2-dialkoxypropane having the formula:

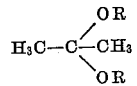

wherein R is a lower alkyl group containing from 2 to 8 carbon atoms, comprising, contacting at a temperature between about 0° C. and about 250° C., 2,2-dialkoxypropane having the formula:

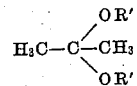

wherein R' is a lower alkyl radical containing from 1 to 7 carbon atoms with a trialkyl borate having the formula:

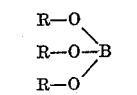

wherein B is the boron atom and R is a lower alkyl radical containing from 2 to 8 carbon atoms, and where R contains a greater number of carbon atoms than R', removing by distillation by-products of the reaction and unreacted starting materials, and, separating the desired 2,2-dialkoxypropane from the reaction mixture.

2. A method for preparing 2,2-dialkoxypropane having the formula:

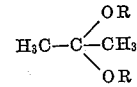

wherein R is a lower alkyl group containing from 2 to 8 carbon atoms, comprising, contacting at a temperature between about 50° C. and 200° C., 2,2-dialkoxypropane having the formula:

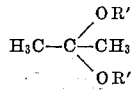

wherein R' is a lower alkyl radical containing from 1 to 7 carbon atoms with a trialkyl borate having the formula:

wherein B is the boron atom and R is a lower alkyl radical containing from 2 to 8 carbon atoms, and where R contains a greater number of carbon atoms than R', removing by distillation by-products of the reaction and unreacted starting materials, and, separating the desired 2,2-dialkoxypropane from the reaction mixture.

3. A method for preparing 2,2-dibutoxypropane comprising, contacting, at a temperature between about 0° C. and about 200° C., 2,2-dimethoxypropane and tributyl borate, removing by distillation by-products of the reaction and unreacted starting materials, and, separating the 2,2-dibutoxypropane from the reaction mixture.

References Cited in the file of this patent

MacKenzie et al.: Organic Chemistry, Vol. 20, No. 12 (1955), page 1700.

Kuskov et al.: Chem. Abs., Vol. 50 (1956), pp. 13832–13833.